US008914703B2

(12) United States Patent  (10) Patent No.: US 8,914,703 B2
Tomlin (45) Date of Patent: Dec. 16, 2014

(54) METHOD FOR COPYING DATA IN REPROGRAMMABLE NON-VOLATILE MEMORY

(75) Inventor: Andrew Tomlin, San Jose, CA (US)

(73) Assignee: Sandisk Technologies, Inc., Plano, TX (US)

( * ) Notice: Subject to any disclaimer, the term of this patent is extended or adjusted under 35 U.S.C. 154(b) by 135 days.

(21) Appl. No.: 12/941,294

(22) Filed: Nov. 8, 2010

(65) Prior Publication Data

US 2011/0072332 A1    Mar. 24, 2011

Related U.S. Application Data

(63) Continuation of application No. 11/022,350, filed on Dec. 21, 2004, now Pat. No. 7,849,381.

(51) Int. Cl.
*G11C 29/00* (2006.01)
*G06F 11/10* (2006.01)
*G06F 12/02* (2006.01)

(52) U.S. Cl.
CPC ........ *G06F 12/0246* (2013.01); *G06F 11/1068* (2013.01); *G06F 2212/7203* (2013.01)
USPC ...................................................... 714/763

(58) Field of Classification Search
CPC ............ G06F 11/1076; G06F 11/1008; G06F 11/1068; G06F 999/99; G06F 11/1044
USPC ......................................................... 714/763
See application file for complete search history.

(56) References Cited

U.S. PATENT DOCUMENTS

| 4,251,863 A | 2/1981 | Rothenberger |
| 4,357,685 A | 11/1982 | Daniele et al. |
| 4,785,427 A | 11/1988 | Young |

(Continued)

FOREIGN PATENT DOCUMENTS

| DE | 246857 | 6/1987 |
| EP | 0 735 491 A | 10/1996 |

(Continued)

OTHER PUBLICATIONS

Nakamura et al., "A Novel Sense Amplifier for Flexible Voltage Operation NAND Flash Memories," 1995 *Symposium on VLSI Circuits Digest of Technical Papers*, Jun. 8-10, 1995, pp. 71-72.

(Continued)

*Primary Examiner* — Albert Decady
*Assistant Examiner* — Enam Ahmed
(74) *Attorney, Agent, or Firm* — Davis Wright Tremaine LLP

(57) ABSTRACT

The present invention presents methods for improving data relocation operations. In one aspect, rather than check the quality of the data based on its associated error correction code (ECC) in every relocation operation, it is determined whether to check ECC based on predetermined selection criteria, and if ECC checking is not selected, causing the memory to perform an on-chip copy the data from a first location to a second location. If ECC checking is selected, the data is transferred to the controller and checked; when an error is found, a correction operation is performed and when no error is found, an on-chip copy is performed. The predetermined selection criteria may comprise a sampling mechanism, which may be random based or deterministic. In another aspect, data transfer flags are introduced to indicate data has been corrected and should be transferred back to the memory.

16 Claims, 12 Drawing Sheets

(56) References Cited

U.S. PATENT DOCUMENTS

| | | | |
|---|---|---|---|
| 5,034,922 A | 7/1991 | Burgess | |
| 5,070,032 A | 12/1991 | Yuan et al. | |
| 5,093,806 A | 3/1992 | Tran | |
| 5,095,344 A | 3/1992 | Harari | |
| 5,111,385 A * | 5/1992 | Hattori | 711/157 |
| 5,172,338 A | 12/1992 | Mehrotra et al. | |
| 5,233,616 A | 8/1993 | Callander | |
| 5,245,571 A | 9/1993 | Takahashi | |
| 5,267,242 A | 11/1993 | Lavallee et al. | |
| 5,274,646 A | 12/1993 | Brey et al. | |
| 5,313,421 A | 5/1994 | Guterman et al. | |
| 5,315,541 A | 5/1994 | Harari et al. | |
| 5,343,063 A | 8/1994 | Yuan et al. | |
| 5,406,565 A * | 4/1995 | MacDonald | 714/711 |
| 5,418,752 A | 5/1995 | Harari et al. | |
| 5,465,235 A | 11/1995 | Miyamoto | |
| 5,519,847 A | 5/1996 | Fandrich et al. | |
| 5,537,356 A | 7/1996 | Akaogi et al. | |
| 5,570,315 A | 10/1996 | Tanaka et al. | |
| 5,586,285 A | 12/1996 | Hasbun et al. | |
| 5,595,924 A | 1/1997 | Yuan et al. | |
| 5,661,053 A | 8/1997 | Yuan | |
| 5,691,994 A | 11/1997 | Acosta et al. | |
| 5,692,165 A | 11/1997 | Jeddeloh et al. | |
| 5,734,816 A | 3/1998 | Niijima et al. | |
| 5,740,394 A | 4/1998 | Minemura et al. | |
| 5,768,192 A | 6/1998 | Eitan | |
| 5,768,194 A | 6/1998 | Matsubara | |
| 5,768,215 A | 6/1998 | Kwon et al. | |
| 5,774,397 A | 6/1998 | Endoh et al. | |
| 5,815,444 A | 9/1998 | Ohta | |
| 5,822,245 A | 10/1998 | Gupta et al. | |
| 5,860,082 A | 1/1999 | Smith et al. | |
| 5,862,099 A | 1/1999 | Gannage et al. | |
| 5,867,723 A * | 2/1999 | Chin et al. | 712/11 |
| 5,872,739 A | 2/1999 | Womack | |
| 5,890,192 A | 3/1999 | Lee et al. | |
| 5,893,135 A | 4/1999 | Hasbun et al. | |
| 5,903,495 A | 5/1999 | Takeuchi et al. | |
| 5,912,906 A | 6/1999 | Wu et al. | |
| 5,920,502 A | 7/1999 | Noda et al. | |
| 5,930,167 A | 7/1999 | Lee et al. | |
| 5,949,720 A | 9/1999 | Brady | |
| 5,969,986 A | 10/1999 | Wong et al. | |
| 6,011,287 A | 1/2000 | Itoh et al. | |
| 6,011,725 A | 1/2000 | Eitan | |
| 6,012,122 A | 1/2000 | Choi et al. | |
| 6,021,463 A | 2/2000 | Belser | |
| 6,029,233 A | 2/2000 | Abily et al. | |
| 6,038,174 A | 3/2000 | Khan et al. | |
| 6,040,997 A | 3/2000 | Estakhri | |
| 6,046,935 A | 4/2000 | Takeuchi et al. | |
| 6,046,940 A | 4/2000 | Takeuchi et al. | |
| 6,052,815 A | 4/2000 | Zook | |
| 6,097,638 A | 8/2000 | Himeno et al. | |
| 6,101,624 A | 8/2000 | Cheng et al. | |
| 6,119,260 A | 9/2000 | Tomisawa et al. | |
| 6,181,598 B1 | 1/2001 | Matsubara et al. | |
| 6,222,762 B1 | 4/2001 | Guterman et al. | |
| 6,222,767 B1 | 4/2001 | Kendall et al. | |
| 6,243,291 B1 | 6/2001 | Cheah | |
| 6,253,250 B1 | 6/2001 | Evan et al. | |
| 6,266,273 B1 | 7/2001 | Conley et al. | |
| 6,282,624 B1 | 8/2001 | Kimura et al. | |
| 6,295,619 B1 | 9/2001 | Hasbun et al. | |
| 6,317,371 B2 | 11/2001 | Katayama et al. | |
| 6,330,185 B1 | 12/2001 | Wong et al. | |
| 6,349,056 B1 | 2/2002 | Conley et al. | |
| 6,373,746 B1 | 4/2002 | Takeuchi et al. | |
| 6,374,337 B1 | 4/2002 | Estakhri | |
| 6,388,920 B2 | 5/2002 | Katayama et al. | |
| 6,407,953 B1 | 6/2002 | Cleeves | |
| 6,421,279 B1 | 7/2002 | Tobita et al. | |
| 6,426,893 B1 | 7/2002 | Conley et al. | |
| 6,449,625 B1 | 9/2002 | Wang | |
| 6,456,528 B1 | 9/2002 | Chen | |
| 6,490,199 B2 | 12/2002 | Lee et al. | |
| 6,490,649 B2 | 12/2002 | Sinclair | |
| 6,504,757 B1 | 1/2003 | Hollmer et al. | |
| 6,522,586 B2 | 2/2003 | Wong | |
| 6,525,952 B2 | 2/2003 | Araki et al. | |
| 6,546,440 B1 * | 4/2003 | Verinsky et al. | 710/62 |
| 6,560,143 B2 | 5/2003 | Conley et al. | |
| 6,570,809 B1 | 5/2003 | Lin | |
| 6,581,142 B1 | 6/2003 | Jacobs | |
| 6,647,469 B1 * | 11/2003 | Sharma et al. | 711/147 |
| 6,657,891 B1 | 12/2003 | Shibata et al. | |
| 6,671,204 B2 | 12/2003 | Im | |
| 6,697,915 B2 * | 2/2004 | Suzuki et al. | 711/113 |
| 6,717,857 B2 | 4/2004 | Byeon et al. | |
| 6,731,539 B1 | 5/2004 | Wong | |
| 6,738,289 B2 | 5/2004 | Gongwer et al. | |
| 6,744,667 B2 | 6/2004 | Yamamoto et al. | |
| 6,940,753 B2 | 9/2005 | Cernea | |
| 6,972,993 B2 | 12/2005 | Conley et al. | |
| 6,983,428 B2 | 1/2006 | Cernea | |
| 6,996,003 B2 | 2/2006 | Li et al. | |
| 7,009,878 B2 | 3/2006 | Hosono et al. | |
| 7,012,835 B2 | 3/2006 | Gonzalez et al. | |
| 7,023,736 B2 | 4/2006 | Cernea et al. | |
| 7,039,781 B2 | 5/2006 | Iwata et al. | |
| 7,120,051 B2 | 10/2006 | Gorobets et al. | |
| 7,170,782 B2 | 1/2007 | Conley et al. | |
| 7,181,485 B1 | 2/2007 | Lau et al. | |
| 7,266,747 B2 | 9/2007 | Foss | |
| 7,376,011 B2 | 5/2008 | Conley et al. | |
| 7,921,301 B2 | 4/2011 | Ashmore | |
| 2001/0006479 A1 | 7/2001 | Ikehashi et al. | |
| 2001/0040826 A1 | 11/2001 | Lakhani | |
| 2002/0036925 A1 | 3/2002 | Tanzawa et al. | |
| 2002/0039322 A1 | 4/2002 | Tran et al. | |
| 2002/0099904 A1 | 7/2002 | Conley | |
| 2002/0103885 A1 * | 8/2002 | Hamada | 709/219 |
| 2002/0118574 A1 | 8/2002 | Gongwer et al. | |
| 2002/0124143 A1 | 9/2002 | Barroso et al. | |
| 2002/0126528 A1 | 9/2002 | Conley et al. | |
| 2002/0126532 A1 | 9/2002 | Matsunaga et al. | |
| 2003/0065899 A1 | 4/2003 | Gorobets | |
| 2003/0070036 A1 | 4/2003 | Gorobets | |
| 2003/0072192 A1 | 4/2003 | Bloom et al. | |
| 2003/0088729 A1 | 5/2003 | Polizzi et al. | |
| 2003/0099134 A1 | 5/2003 | Lasser et al. | |
| 2003/0117850 A1 | 6/2003 | Yano | |
| 2003/0123295 A1 | 7/2003 | Elmhurst et al. | |
| 2003/0137888 A1 | 7/2003 | Chen et al. | |
| 2003/0147297 A1 | 8/2003 | Shiota et al. | |
| 2003/0163629 A1 | 8/2003 | Conley et al. | |
| 2003/0169630 A1 | 9/2003 | Hosono et al. | |
| 2003/0174555 A1 | 9/2003 | Conley et al. | |
| 2004/0001356 A1 | 1/2004 | Kawamura et al. | |
| 2004/0019760 A1 | 1/2004 | Lin et al. | |
| 2004/0027857 A1 | 2/2004 | Ooishi | |
| 2004/0057285 A1 | 3/2004 | Cernea et al. | |
| 2004/0057287 A1 | 3/2004 | Cernea et al. | |
| 2004/0057318 A1 | 3/2004 | Cernea et al. | |
| 2004/0060031 A1 | 3/2004 | Cernea | |
| 2004/0109357 A1 | 6/2004 | Cernea et al. | |
| 2004/0109362 A1 | 6/2004 | Gongwer et al. | |
| 2004/0117723 A1 | 6/2004 | Foss | |
| 2004/0160829 A1 | 8/2004 | Tsujikawa et al. | |
| 2004/0210729 A1 | 10/2004 | Horii et al. | |
| 2004/0237000 A1 | 11/2004 | Keays | |
| 2004/0240269 A1 | 12/2004 | Cernea | |
| 2005/0157560 A1 | 7/2005 | Hosono et al. | |
| 2005/0162913 A1 | 7/2005 | Chen | |
| 2005/0169082 A1 | 8/2005 | Cernea | |
| 2005/0246513 A1 | 11/2005 | Oba | |
| 2005/0257120 A1 | 11/2005 | Gorobets et al. | |
| 2006/0031593 A1 | 2/2006 | Sinclair | |
| 2006/0126390 A1 | 6/2006 | Gorobets et al. | |
| 2006/0126393 A1 | 6/2006 | Li | |
| 2006/0126394 A1 | 6/2006 | Li | |
| 2006/0136687 A1 | 6/2006 | Smith et al. | |
| 2006/0140007 A1 | 6/2006 | Cernea et al. | |

(56) References Cited

U.S. PATENT DOCUMENTS

| | | |
|---|---|---|
| 2006/0156189 A1 | 7/2006 | Tomlin |
| 2006/0221696 A1 | 10/2006 | Li |
| 2006/0221697 A1 | 10/2006 | Li |
| 2006/0221704 A1 | 10/2006 | Li |
| 2006/0221714 A1 | 10/2006 | Li et al. |
| 2006/0233010 A1 | 10/2006 | Li |
| 2006/0233021 A1 | 10/2006 | Lin et al. |
| 2006/0233022 A1 | 10/2006 | Li |
| 2006/0233023 A1 | 10/2006 | Li et al. |
| 2006/0233026 A1 | 10/2006 | Li |
| 2006/0239080 A1 | 10/2006 | Li |
| 2008/0126885 A1* | 5/2008 | Tangvald et al. ............ 714/54 |
| 2009/0063786 A1* | 3/2009 | Oh ............................ 711/148 |

FOREIGN PATENT DOCUMENTS

| | | |
|---|---|---|
| EP | 1008940 | 6/2000 |
| EP | 1280161 A1 | 1/2003 |
| EP | 0615184 | 9/2004 |
| GB | 2 034 942 | 6/1980 |
| JP | 5282883 | 10/1993 |
| JP | 11003290 | 11/1999 |
| JP | 2001 297447 A | 10/2001 |
| JP | 2002-229924 A | 8/2002 |
| JP | 2003-085034 | 3/2003 |
| JP | 2005-078378 A | 2/2005 |
| KR | 2001 037452 A | 5/2001 |
| TW | 444202 | 7/2001 |
| TW | 550573 | 9/2003 |
| WO | WO 98/44420 | 10/1998 |
| WO | WO 00/49488 | 8/2000 |
| WO | WO 00/67137 | 11/2000 |
| WO | WO 02/49039 A2 | 6/2002 |
| WO | WO 02/058074 A2 | 7/2002 |
| WO | WO 03/029951 A2 | 4/2003 |
| WO | WO 03/069627 A1 | 8/2003 |

OTHER PUBLICATIONS

Srisa-an et al., "Performance Enhancements to the Active Memory System," *2002 IEEE International Conference on Computer Design: VLSI in Computers and Processors*, Sep. 16-18, 2002, pp. 249-256.

Lee et al., "High-Performance 1-Gb NAND Flash Memory with 0.12-μm Technology," *Journal of Solid-State Circuits*, Nov. 2002, vol. 37, No. 11, pp. 1502-1509.

Imamiya et al., "A 125-mm$^2$ 1-Gb NAND Memory with 10/Mbyte/s Program Speed,"*IEEE Journal of Solid State Circuits*, vol. 37, No. 11, Nov. 2002, pp. 1493-1501.

Toshiba MOS Digital Integrated Circuit Silicon Gate CMOS Data Sheet, TC52NDG1SBFT10, *Toshiba*, Dec. 5, 2002, pp. 1/46, 35/46-37/46.

Office Action for U.S. Appl. No. 11/022,350 mailed Sep. 27, 2007, 35 pages.

Eitan et al., "NROM: A Novel Localized Trapping, 2-Bit Nonvolatile Memory Cell," IEEE Electron Deivce Letters, vol. 21, No. 11, Nov. 2000, pp. 543-545.

Notification of Transmittal of the International Search Report and the Written Opinion of the International Searching Authority, or the Declaration for International Application No. PCT/US2005/045695 mailed May 8, 2006, 10 pages.

Listing of Pending Claims for International Application No. PCT/US2005/045695, 4 pages.

"Communication Relating to the Results of the Partial International Seach," for Application No. PCT/US2005/045909 for SanDisk Corporation, Sep. 21, 2006, 3 pages.

"Notification of Transmittal of the International Search Report and the Written Opinion of the International Searching Authority, or the Declaration," for Application No. PCT/US2005/045909 for SanDisk Corporation, Nov. 14, 2006, 33 pages.

Derwent Abstract of JP-229924A, Derwent Acct. No. 2002-639959, 2002, 4 pages.

Communication Pursuant to Article 96(2) EPC for SanDisk Corporation, Application No. 05 854 589.8, dated Oct. 9, 2007, 5 pages.

Communication under Rule 71(3) EPC, European Application No. 05 854 589.8, dated Mar. 28, 2008, 44 pages.

Notification of Reasons of Refusal for Japanese Patent Application No. 2007-548357 dated Dec. 6, 2011, 4 pages.

Office Action for Taiwan Application No. 094145667 mailed Mar. 19, 2013, 19 pages.

Office Action for Taiwan Application No. 094145667 dated Oct. 24, 2013, 10 pages.

\* cited by examiner

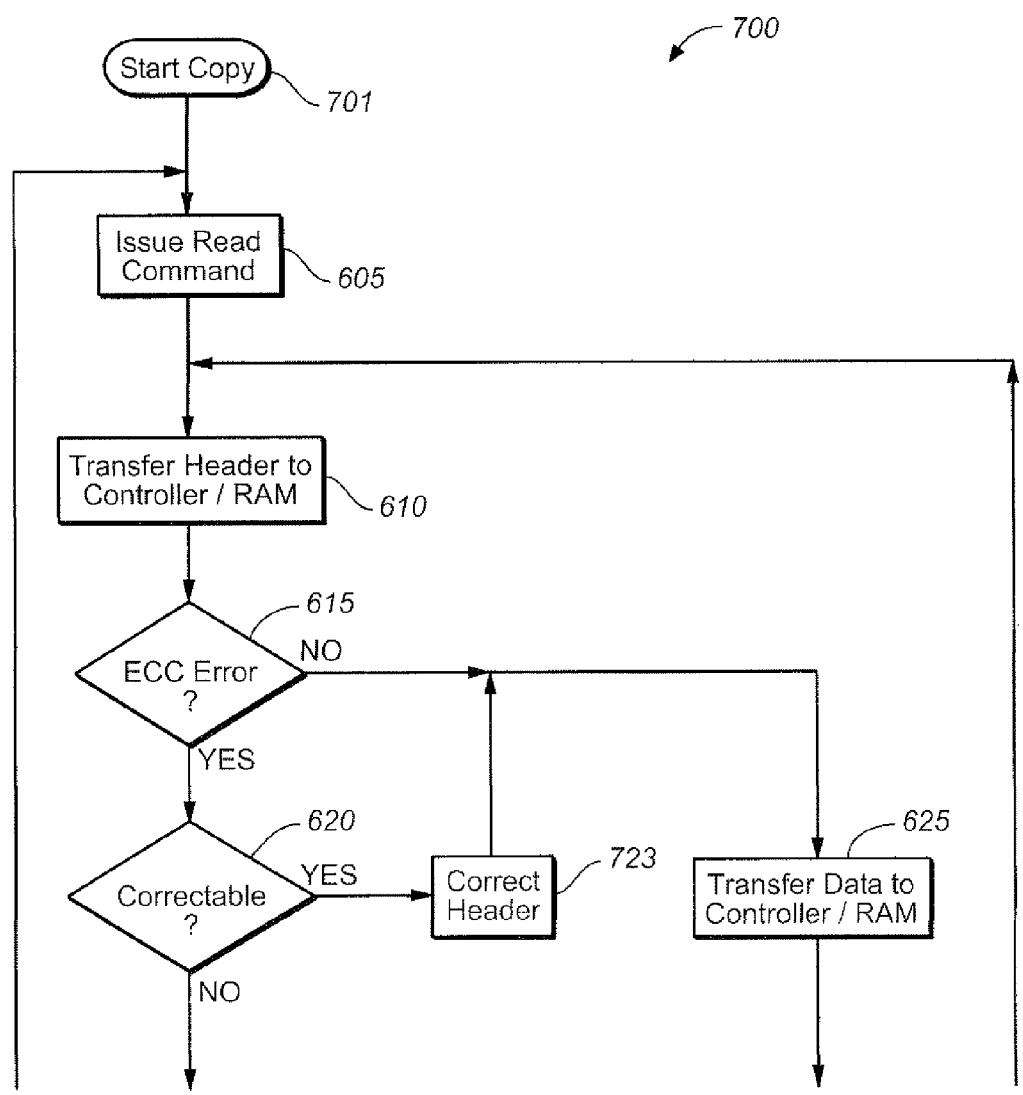

METHOD FOR COPYING DATA IN REPROGRAMMABLE NON-VOLATILE MEMORY

CROSS-REFERENCE TO RELATED APPLICATION

This application is a continuation of U.S. application Ser. No. 11/022,350 filed Dec. 21, 2004, which application is incorporated in its entirety by this reference.

FIELD OF THE INVENTION

This invention relates generally to reprogrammable non-volatile memory systems and their operation, and more specifically to techniques for copying data.

BACKGROUND OF THE INVENTION

Reprogrammable non-volatile memory products are commercially successful and widely available today, particularly in the form of small form factor cards such as the CompactFlash cards (CF), Secure Digital cards (SD), MultiMediaCards (MMC) and Memory Stick cards that are produced by various vendors including SanDisk Corporation. Such cards typically use an array of flash Electrically Erasable and Programmable Read Only Memory (EEPROM) memory cells. Flash EEPROM memory cell arrays are typically produced either as NOR arrays or NAND arrays.
NOR Array In a typical NOR array, memory cells are connected between adjacent bit line source and drain diffusions that extend in a column direction with control gates connected to word lines extending along rows of cells. One typical memory cell has a "split-channel" between source and drain diffusions. A charge storage element of the cell is positioned over one portion of the channel and the word line (also referred to as a control gate) is positioned over the other channel portion as well as over the charge storage element. This effectively forms a cell with two transistors in series, one (the memory transistor) with a combination of the amount of charge on the charge storage element and the voltage on the word line controlling the amount of current that can flow through its portion of the channel, and the other (the select transistor) having the word line alone serving as its gate. The word line extends over a row of charge storage elements. Examples of such cells, their uses in memory systems and methods of manufacturing them are given in U.S. Pat. Nos. 5,070,032, 5,095,344, 5,315,541, 5,343,063, and 5,661,053, and in co-pending U.S. patent application Ser. No. 09/239,073, filed Jan. 27, 1999.

A modification of this split-channel flash EEPROM cell adds a steering gate positioned between the charge storage element and the word line. Each steering gate of an array extends over one column of charge storage elements, perpendicular to the word line. The effect is to relieve the word line from having to perform two functions at the same time when reading or programming a selected cell. Those two functions are (1) to serve as a gate of a select transistor, thus requiring a proper voltage to turn the select transistor on and off, and (2) to drive the voltage of the charge storage element to a desired level through an electric field (capacitive) coupling between the word line and the charge storage element. It is often difficult to perform both of these functions in an optimum manner with a single voltage. With the addition of the steering gate, the word line need only perform function (1), while the added steering gate performs function (2). The use of steering gates in a flash EEPROM array is described, for example, in U.S. Pat. Nos. 5,313,421 and 6,222,762.

There are various programming techniques for injecting electrons from the substrate onto a floating gate storage element through the gate dielectric. The most common programming mechanisms are described in a book edited by Brown and Brewer, Nonvolatile Semiconductor Memory Technology, IEEE Press, section 1.2, pages 9-25 (1998). One technique, termed channel "hot-electron injection" (section 1.2.3), injects electrons from the cell's channel into a region of the floating gate adjacent the cell's drain. Another technique, termed "source side injection" (section 12.4), controls the substrate surface electrical potential along the length of the memory cell channel in a manner to create conditions for electron injection in a region of the channel away from the drain. Source side injection is also described in an article by Kamiya et al., "EPROM Cell with High Gate Injection Efficiency," IEDM Technical Digest, 1982, pages 741-744, and in U.S. Pat. Nos. 4,622,656 and 5,313,421.

Two techniques for removing charge from charge storage elements to erase memory cells are used in both of the two types of NOR memory cell arrays described above. One is to erase to the substrate by applying appropriate voltages to the source, drain and other gate(s) that cause electrons to tunnel through a portion of a dielectric layer between the storage element and the substrate. The other erase technique is to transfer electrons from the storage element to another gate through a tunnel dielectric layer positioned between them. In the first type of cell described above, a third erase gate is provided for that purpose. In the second type of cell described above, which already has three gates because of the use of a steering gate, the charge storage element is erased to the word line, without the necessity to add a fourth gate. Although this later technique adds back a second function to be performed by the word line, these functions are performed at different times, thus avoiding the necessity of making a compromise because of the two functions. When either erase technique is utilized, a large number of memory cells are grouped together for simultaneously erasure, in a "flash." In one approach, the group includes enough memory cells to store the amount of user data stored in a disk sector, namely 512 bytes, plus some overhead data. In another approach, each group contains enough cells to hold several thousand bytes of user data, equal to many disk sectors' worth of data. Multi-block erasure, defect management and other flash EEPROM system features are described in U.S. Pat. No. 5,297,148.

As in most all integrated circuit applications, the pressure to shrink the silicon substrate area required to implement some integrated circuit function also exists with flash EEPROM systems. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell. This is accomplished by dividing a window of a storage element charge level voltage range into more than two states. The use of four such states allows each cell to store two bits of data, eight states stores three bits of data per cell, and so on. A multiple state flash EEPROM structure and operation is described in U.S. Pat. Nos. 5,043,940 and 5,172,338.

Another type of memory cell includes two storage elements that may also be operated in multiple states on each storage element. In this type of cell, two storage elements are included over its channel between source and drain diffusions with a select transistor in between them. A steering gate is included along each column of storage elements and a word line is provided thereover along each row of storage elements. When accessing a given storage element for reading or programming, the steering gate over the other storage element of the cell containing the storage element of interest is raised sufficiently high to turn on the channel under the other storage element no matter what charge level exists on it. This effectively eliminates the other storage element as a factor in reading or programming the storage element of interest in the same memory cell. For example, the amount of current flowing through the cell, which can be used to read its state, is then a function of the amount of charge on the storage element of interest but not of the other storage element in the same cell. Examples of this cell array architecture and operating techniques are described in U.S. Pat. Nos. 5,712,180, 6,103,573 and 6,151,248.

NAND Array

Another flash EEPROM architecture utilizes a NAND array, wherein series strings of more than two memory cells, such as 16 or 32, are connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. An example of a NAND architecture array and its operation as part of a memory system is found in U.S. Pat. Nos. 5,570,315, 5,774,397 and 6,046,935.

The charge storage elements of current flash EEPROM arrays and discussed in the foregoing referenced patents and articles are most commonly electrically conductive floating gates, typically formed from doped polysilicon material. Another type of memory cell useful in flash EEPROM systems utilizes a non-conductive dielectric material in place of a conductive floating gate to store charge in a non-volatile manner. Such a cell is described in an article by Chan et al., "A True Single-Transistor Oxide-Nitride-Oxide EEPROM Device," IEEE Electron Device Letters, Vol. EDL-8, No. 3, March 1987, pp. 93-95. A triple layer dielectric formed of silicon oxide, silicon nitride and silicon oxide ("ONO") is sandwiched between a conductive control gate and a surface of a semi-conductive substrate above the memory cell channel. The cell is programmed by injecting electrons from the cell channel into the nitride, where they are trapped and stored in a limited region. This stored charge then changes the threshold voltage of a portion of the channel of the cell in a manner that is detectable. The cell is erased by injecting hot holes into the nitride. See also Nozaki et al., "A 1-Mb EEPROM with MONOS Memory Cell for Semiconductor Disk Application," IEEE Journal of Solid-State Circuits, Vol. 26, No. 4, April 1991, pp. 497-501, which describes a similar cell in a split-gate configuration where a doped polysilicon gate extends over a portion of the memory cell channel to form a separate select transistor.

U.S. Pat. No. 5,851,881 describes the use of two storage elements positioned adjacent each other over the channel of the memory cell, one being such a dielectric element and the other a conductive floating gate. Two bits of data are stored, one in the dielectric element and the other in the floating gate. The memory cell is programmed into one of four different threshold level combinations, representing one of four storage states, by programming each of the two gates into one of two different charge level ranges.

Another approach to storing two bits in each cell utilizing a dielectric storage element has been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. Multi-state data storage is obtained by separately reading binary states of the spatially separated charge storage regions within the dielectric.

Large Erase Blocks

Memory cells of a typical non-volatile flash array are divided into discrete blocks of cells that are erased together. That is, the block is the erase unit. Each block typically stores one or more pages of data, the page being the unit of programming and reading, although more than one page may be programmed or read in a single operation. Each page typically stores one or more sectors of data, the size of the sector being defined by the host system. An example is a sector of 512 bytes of user data, following a standard established with magnetic disk drives, plus some number of bytes of overhead information about the user data and/or the block in which it is stored.

It is sometimes necessary to erase blocks in order to free them up for a write operation. In this case, valid pages of data within the block to be erased (the original block) are consolidated and copied to another block (the update block) prior to erasing the original block. This process is called "garbage collection." During garbage collection, the remaining valid pages of data from the original block are copied from the original block to the update block. Once the copy operation is complete, the original block gets erased and then the update block becomes the original block.

Typically, copy operations such as those described above for garbage collection require the involvement of a memory controller. One technique for improving the speed of copying data from one location to another is to reduce the controller's involvement with the copy operation by using a feature called on-chip copy. On-chip copy provides a feature whereby data can be read, modified and written back to the memory without transferring all the data to the controller and then back to the memory. On-chip copy provides the functionality of copying data from one location to another in a memory cell array without requiring the data to be transferred to the controller. This technique is described in U.S. Pat. No. 6,266,273 and assigned to SanDisk Corporation, the assignee of the present invention.

The patents, patent applications, articles and book portions identified above are all hereby expressly incorporated in their entirety into this Background by these references.

SUMMARY OF THE INVENTION

Generally, the present invention provides methods for data relocation operations, where data is copied from a first memory location to a second memory location of a reprogrammable non-volatile memory system. Data is read from the first location into a register or buffer memory on the memory and then either copied directly to the second location or transferred to the system's controller where the data can be checked and, if needed, corrected based on its associated error correction code (ECC). In first aspect of the present invention, in order to improve performance, the ECC need not be checked for each data copy. Rather, the FCC can be checked selectively, based on predetermined selection criteria. If ECC checking is not selected, the memory is caused to perform an on-chip copy of the data from the first location to the second location, otherwise, continuing as described above based on whether an ECC error is found or not. The predetermined selection criteria may be a sampling mechanism, which may be random based or deterministic.

In another aspect of the present invention, which can be combined with the first aspect or used independently, a transfer flag method is employed. Based on whether the data is transferred to the controller for an error detection and correction operation, a transfer flag value is set. If the data is transferred to the host and it is determined that no error correction is necessary, the flag is not set; if an error correction operation is needed and successfully performed, the transfer flag is set. The decision of whether a corrected form of the data needs to be returned to the memory for copying into the second location is then based on the flag value.

In a further aspect of the present invention, when the data consists of a user data portion and a header or overhead portion and each of these portions has its own associated ECC, the error detection and correction operation of the overhead portion can be treated separately from that of the user data portion. In exemplary embodiments, the overhead is transferred first to the controller for error detection and correction. If the user data is also to be treated, it follows afterwards. In particular, one example of the sampling mechanism used to decide whether to transfer the user data is based on the content of the overhead.

Additional aspects, features and advantages of the present invention are included in the following description of specific representative embodiments, which description should be taken in conjunction with the following drawings.

DESCRIPTION OF REPRESENTATIVE EMBODIMENTS

Figure 1:
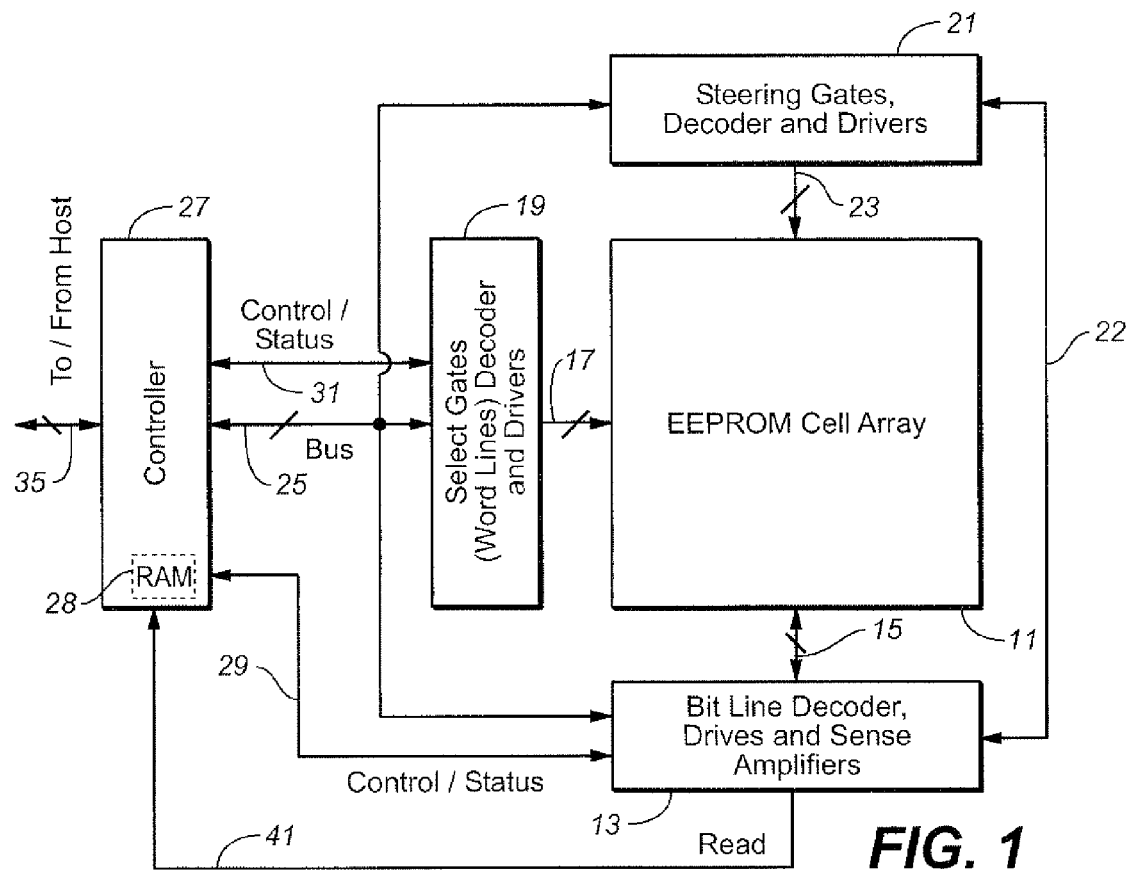
FIG. 1 is a block diagram of a first non-volatile memory system in which the present invention may be implemented.

FIG. 1 is a block diagram of a first non-volatile memory system in which the present invention may be implemented. A large number of individually addressable memory cells 11 are arranged in a regular array of rows and columns, although other physical arrangements of cells are certainly possible. This system is particularly adapted for the array 11 to be the NOR type, as described above in the Background and in references incorporated herein. Bit lines, designated herein to extend along columns of the array 11 of cells, are electrically connected with a bit line decoder and driver circuit 13 through lines 15. Word lines, which are designated in this description to extend along rows of the array 11 of cells, are electrically connected through lines 17 to a word line decoder and driver circuit 19. Steering gates, which extend along columns of memory cells in the array 11, are electrically connected to a steering gate decoder and driver circuit 21 through lines 23. Each of the decoders 13, 19 and 21 receives memory cell addresses over a bus 25 from a memory controller 27. The decoder and driving circuits are also connected to the controller 27 over respective control and status signal lines 29, 31 and 33. Voltages applied to the steering gates and bit lines are coordinated through a bus 22 that interconnects the decoder and driver circuits 13 and 21. The controller includes various types of registers and other memory including a volatile random-access-memory (RAM) 28.

The controller 27 is connectable through lines 35 to a host device (not shown). The host may be a personal computer, notebook computer, digital camera, audio player, various other hand held electronic devices, and the like. The memory system of FIG. 1 will commonly be implemented in a card according to one of several existing physical and electrical standards, such as one from the PCMCIA, the CompactFlash™ Association, the MMC™ Association, and others. When in a card format, the lines 35 terminate in a connector on the card that interfaces with a complementary connector of the host device. The electrical interface of many cards follows the ATA standard, wherein the memory system appears to the host as if it was a magnetic disk drive. Other memory card interface standards also exist. As an alternative to the card format, a memory system of the type shown in FIG. 1 may be permanently embedded in the host device.

The decoder and driver circuits 13, 19 and 21 generate appropriate voltages in their respective lines of the array 11, as addressed over the bus 25, according to control signals in respective control and status lines 29, 31 and 33, to execute programming, reading and erasing functions. Any status signals, including voltage levels and other array parameter, are provided by the array 11 to the controller 27 over the same control and status lines 29, 31 and 33. A plurality of sense amplifiers within the circuit 13 receive current or voltage levels that are indicative of the states of addressed memory cells within the array 11, and provides the controller 27 with information about those states over lines 41 during a read operation. A large number of sense amplifiers are usually used in order to be able to read the states of a large number of memory cells in parallel. During reading and program operations, one row of cells is typically addressed at a time through the circuits 19 for accessing a number of cells in the addressed row that are selected by the circuits 13 and 21. During an erase operation, all cells in each of many rows are typically addressed together as a block for simultaneous erasure.

Operation of a memory system such as illustrated in FIG. 1 is further described in patents and articles identified in the NOR Array section of the Background above, and in other patents assigned to SanDisk Corporation, assignee of the present application. In addition, U.S. patent application Ser. No. 09/793,370, filed Feb. 26, 2001, describes a data programming method, which application is incorporated herein by this reference.

Figure 2:
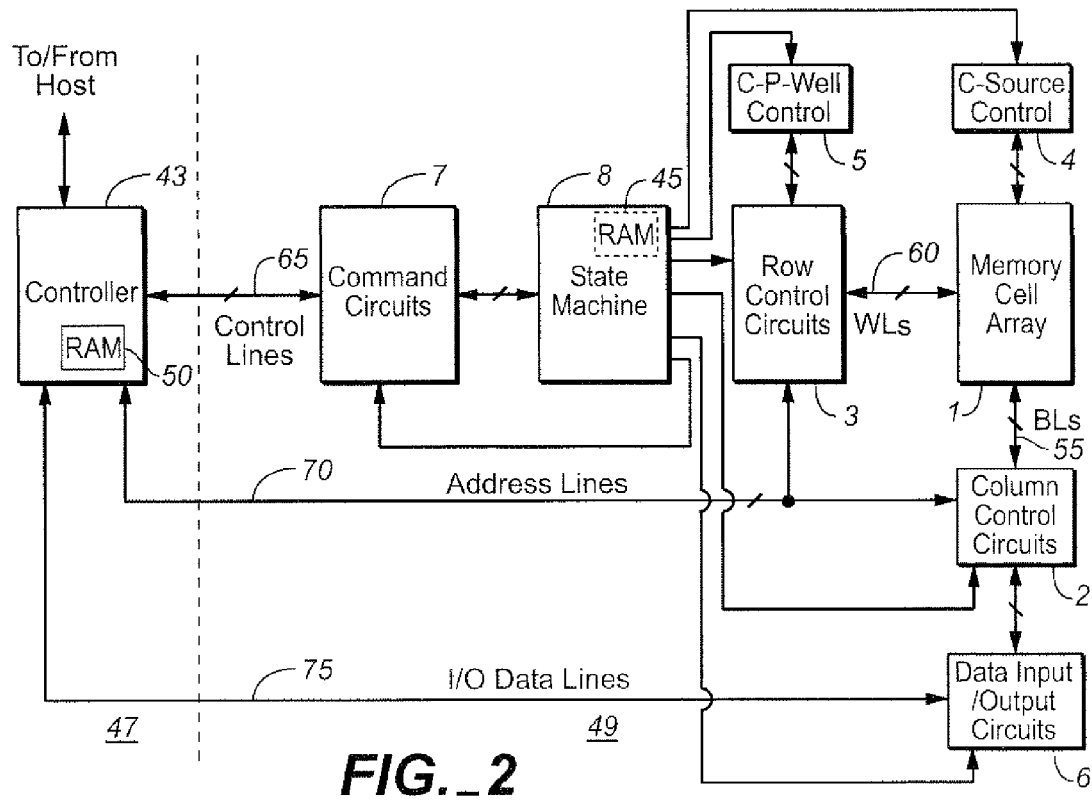
FIG. 2 is a block diagram of a first non-volatile memory system in which the present invention may be implemented.

FIG. 2 is a block diagram of another non-volatile memory system in which the present invention may be implemented. Memory cell array 1 includes a plurality of memory cells M arranged in a matrix is controlled by a column control circuit 2, a row control circuit 3, a c-source control circuit 4 and a c-p-well control circuit 5. The memory cell array 1 may be of the NAND type that is described above in the Background and in references incorporated herein by reference. A control circuit 2 is connected to bit lines (BL) of the memory cell array 1 for reading data stored in the memory cells (M), for determining a state of the memory cells (M) during a program operation, and for controlling potential levels of the bit lines (BL) to promote the programming or to inhibit the programming. The row control circuit 3 is connected to word lines (WL) to select one of the word lines (WL), to apply read voltages, to apply a program voltages combined with the bit line potential levels controlled by the column control circuit 2, and to apply an erase voltage coupled with a voltage of a p-type region on which the memory cells (M) are formed. The c-source control circuit 4 controls a common source line (labeled as "c-source" in FIG. 2) connected to the memory cells (M). The c-p-well control circuit 5 controls the c-p-well voltage.

The data stored in the memory cells (M) are read out by the column control circuit 2 and are output to external I/O lines via an I/O line and a data input/output buffer 6. Program data to be stored in the memory cells are input to the data input/output buffer 6 via the external I/O lines, and transferred to the column control circuit 2. The external I/O lines are connected to a controller 43. The controller 43 includes various types of registers and other memory, typically in a volatile random access memory (RAM) 50.

Command data for controlling the flash memory device are inputted to command circuits 7 connected to external control lines that are connected with the controller 43. The command data informs the flash memory of what operation is requested. The input command is transferred to a state machine 8 that controls the column control circuit 2, the row control circuit 3, the c-source control circuit 4, the c-p-well control circuit 5 and the data input/output buffer 6. The state machine 8 can output a status data of the flash memory such as READY/BUSY or PASS/FAIL. The state machine 8 also includes a number of registers and other volatile random-access-memory 45.

The controller 43 is connected or connectable with a host system such as a personal computer, a digital camera, or a personal digital assistant. It is the host that initiates commands, such as to store or read data to or from the memory array 1, and provides or receives such data, respectively. The controller converts such commands into command signals that can be interpreted and executed by the command circuits 7. The controller also typically contains buffer memory for the user data being written to or read from the memory array. A typical memory system includes one integrated circuit chip 47 that includes the controller 43, and one or more integrated circuit chips 49 that each contain a memory array and associated control, input/output and state machine circuits. The trend, of course, is to integrate the memory array and controller circuits of a system together on one or more integrated circuit chips.

Either of the memory systems of FIGS. 1 and 2 may be embedded as part of the host system, or may be included in a memory card that is removably insertable into a mating socket of a host system. Such a card may include the entire memory system, or the controller and memory array, with associated peripheral circuits, may be provided in separate cards. Several card implementations are described, for example, in U.S. Pat. No. 5,887,145, which patent is expressly incorporated herein in its entirety by this reference.

Figure 3:
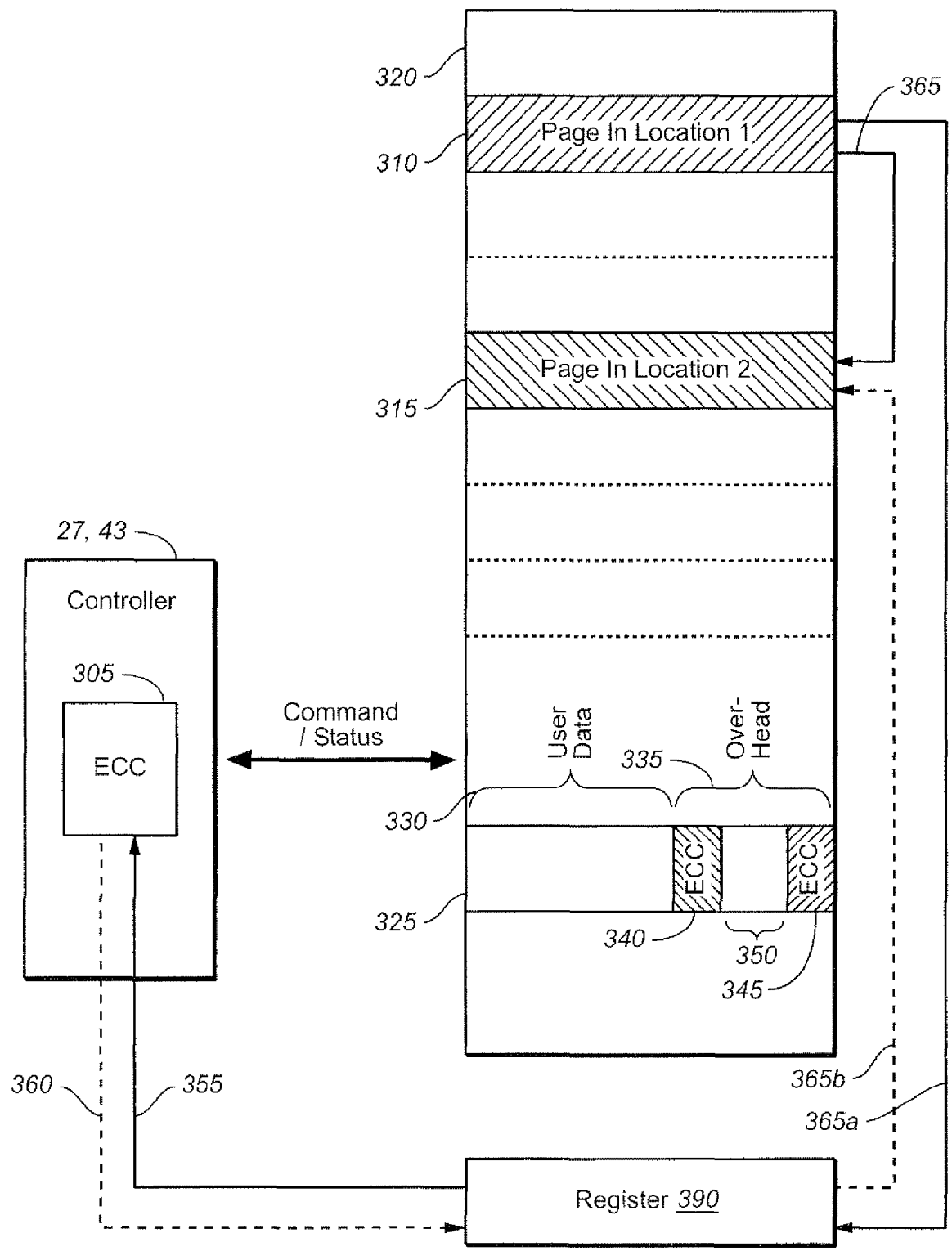
FIG. 3 is a block diagram showing an exemplary system for copying data having an associated error correction code (ECC) in either of the memory systems of FIG. 1 or 2.

FIG. 3 is a block diagram showing an exemplary system for copying data having an associated error correction code (ECC) in either of the memory systems of FIG. 1 or 2. FIG. 3 shows the interaction between a controller 27, 43 and a block of memory 320 when a page of data is written from one location to another. Block 320 of memory includes a plurality of pages at locations 310, 315 and 325. The page shown at location 325 shows the contents of a typical page in memory and includes user data 330 and overhead 335. The overhead 335, also called a header, contains the header ECC 340 and data ECC 345. In other embodiments, a single ECC is used to cover both the header and the data. Overhead 335 also contains additional data 350 pertaining to the user data or characteristics of the page or block, for example, programming voltages, etc. The pages at locations 310 and 315 similarly contain user data and overhead data but these data are not shown for convenience of illustration.

A data relocation operation consists of moving a unit of data from a first location in the memory 320 to a second location, as by arrow 365. In the exemplary embodiment, this consists of moving the page of data from location 1 310 to the memory register 390, as shown by arrow 365a, and then back to location 2 315, as shown by arrow 365b. If the data page is not checked, the data will not be sent to the controller. If the page is checked, after transfer to the register the data from a page in the first location 310 is transferred to buffer or cache (28, 50) in controller circuit 27, 43 where an ECC check is performed using an ECC circuit 305. The data transfer from a first location in memory to the controller is shown by arrow 355. Command/status signals between the controller 27, 43 and the memory array 11, 1 of the systems shown in FIGS. 1 and 2 respectively provide means for performing the transaction and may be implemented in firmware, for example.

If there is an ECC error, the error is corrected and the corrected data is then transferred to a second location 315 in memory, as shown by arrow 360, and then on to second location 315. However, if there is no ECC error then an on-chip copy may be performed, thus avoiding having to write the read data from the controller back to the memory. An on-chip copy operation is shown by arrows 365a and 365b, where the page at location 310 is copied to location 315 in block 320 of memory array 1, 11. (There may be several such registers or buffers 390 on the memory, depending on the architecture used; for example, each memory plane may have a master-slave arrangement for the caching of data during reading and writing.)

Figure 4:
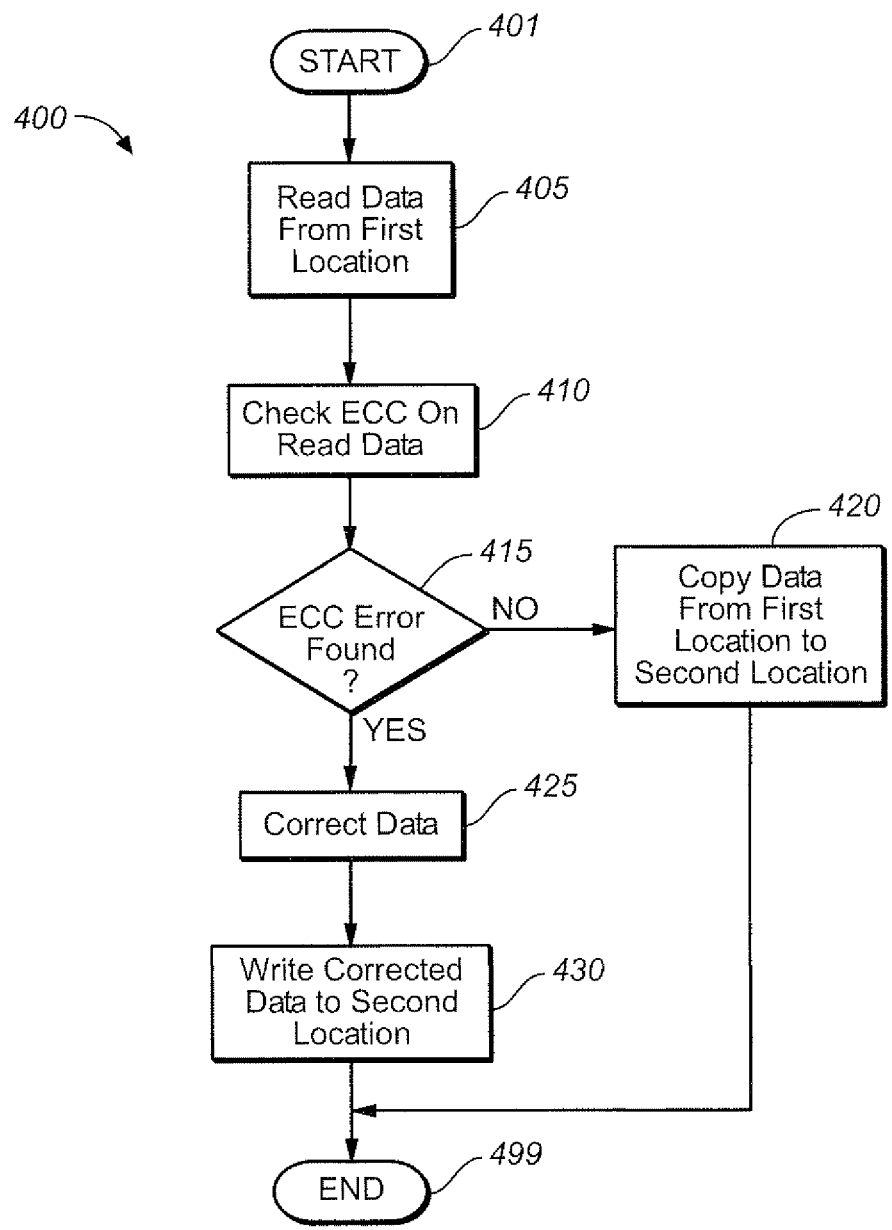
FIG. 4 is a flow chart showing an exemplary method for copying data having an associated error correction code (ECC) in either of the memory systems of FIG. 1 or 2.

FIG. 4 is a flow chart 400 showing an exemplary copy operation of either of the memory systems of FIG. 1 or 2 when copying data having an associated error correction code (ECC). Flow chart 400 shows a method for copying data from a first location to a second location of a reprogrammable non-volatile memory of a system that includes a memory controller 27, 43. The data has an associated error correction code (ECC). ECC is used for correcting errors that occur during data transfers in memory.

The copy operation is initiated at 401 and the data to be copied is read at 405 from a first memory location into a memory register then on to the controller. The read data in the controller contains an ECC that was calculated from the data and programmed along with them, either in the same page or elsewhere. In the example system shown in FIG. 3, the ECC is programmed in the same page, however, the ECC could be stored elsewhere. The FCC on the read data is checked at 410 to reveal possible ECC errors. At 415, a determination is made as to whether an ECC error has been found. If an ECC error is found, then at 425 the error on the read data in the controller is corrected and at 430 the controller is caused to write the corrected data to the second location of the memory, thus completing the copy operation at 499. If the error cannot be corrected, then the copy operation is aborted or possibly retried a number of times prior to being aborted. If an ECC error is not found, then at 420 the memory is caused to copy the data from the first location to the second location. Consequently, if there is no ECC error and the data does not need correction, the copy retained on the memory can be written directly to the second location. This provides the advantage of not requiring the controller to be involved in the process of writing the data back to the memory, thus making the copy operation faster while still retaining the benefit of checking the ECC.

Figure 5:
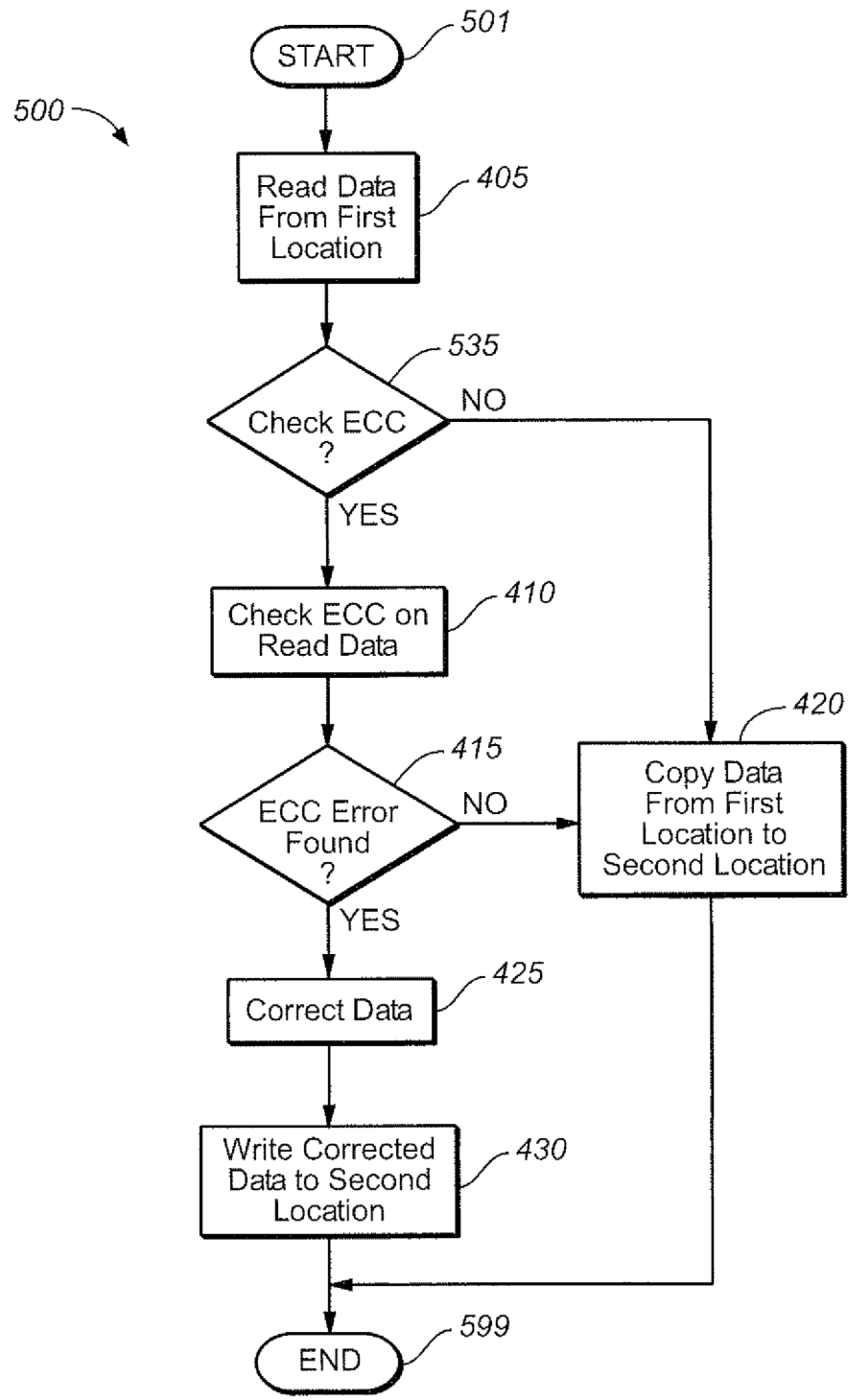
FIG. 5 is a flow chart showing an exemplary method for copying data having an associated error correction code (ECC) in either of the memory systems of FIG. 1 or 2.
Figure 6:
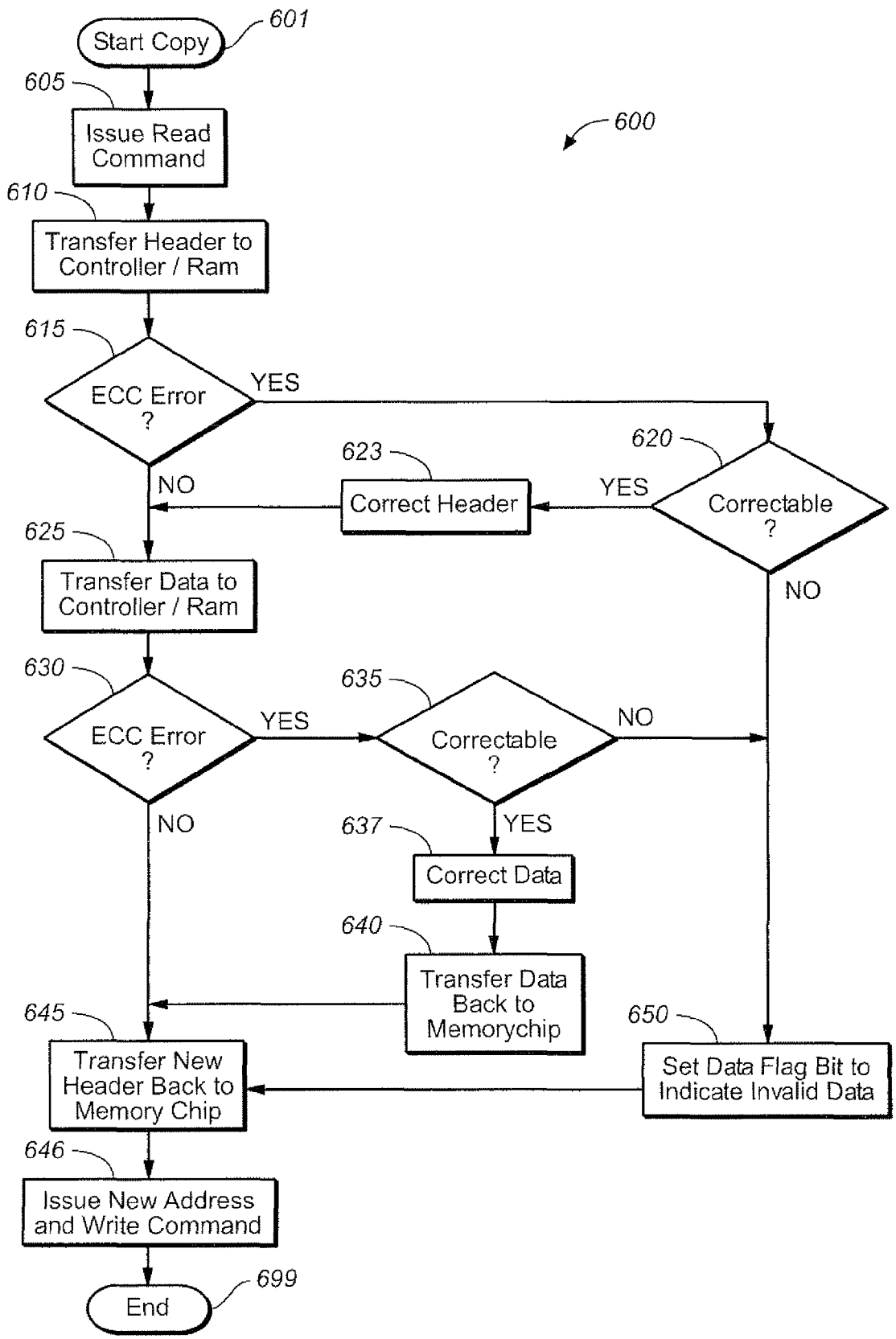
FIG. 6 is a flow chart showing an exemplary method for copying data having an associated error correction code (ECC) in either of the memory systems of FIG. 1 or 2.
Figure 7B:
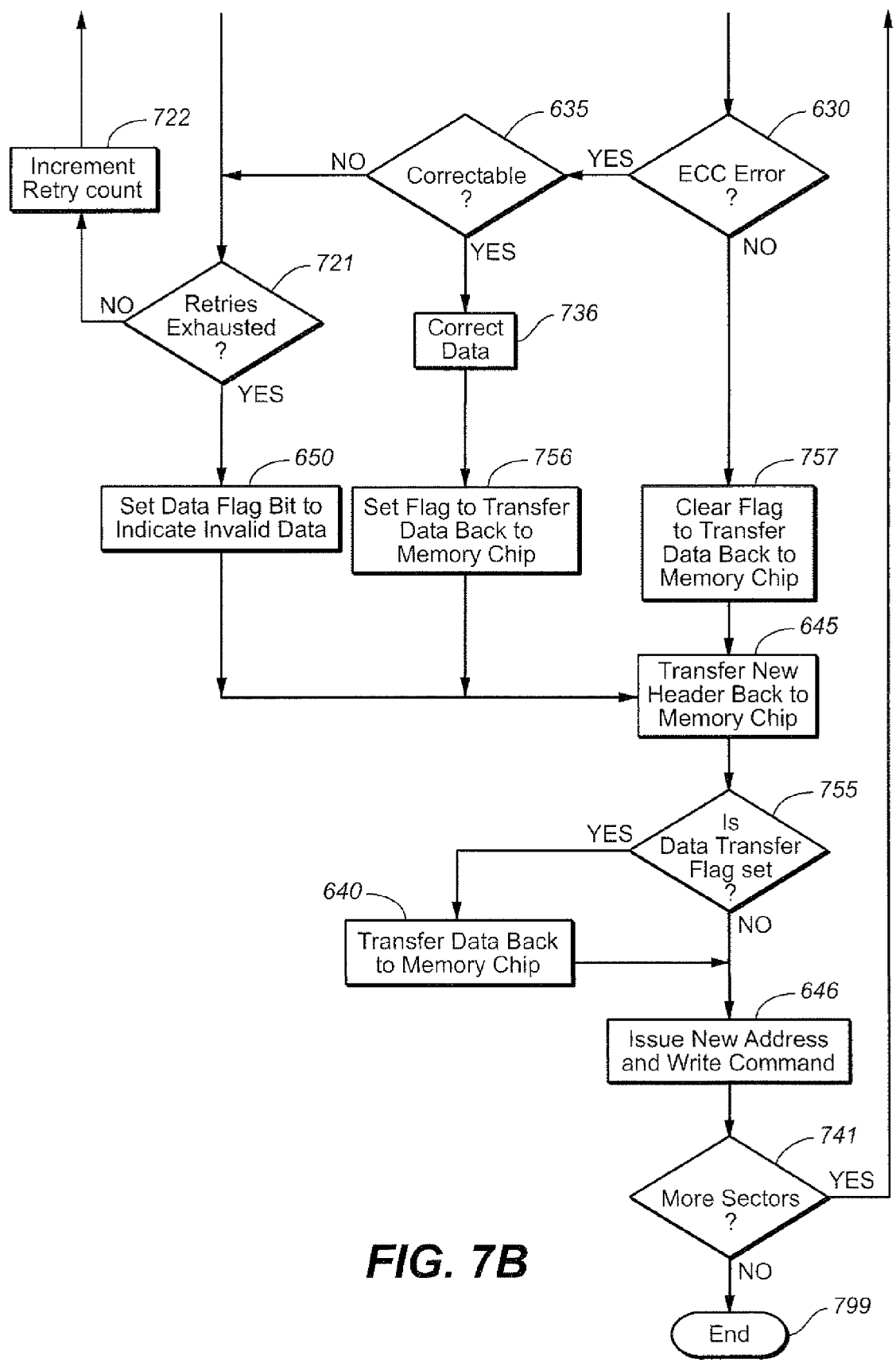
FIG. 7 is a flow chart showing an exemplary method for copying data having an associated error correction code (ECC) in either of the memory systems of FIG. 1 or 2.
Figures 8, 8A, 8B:
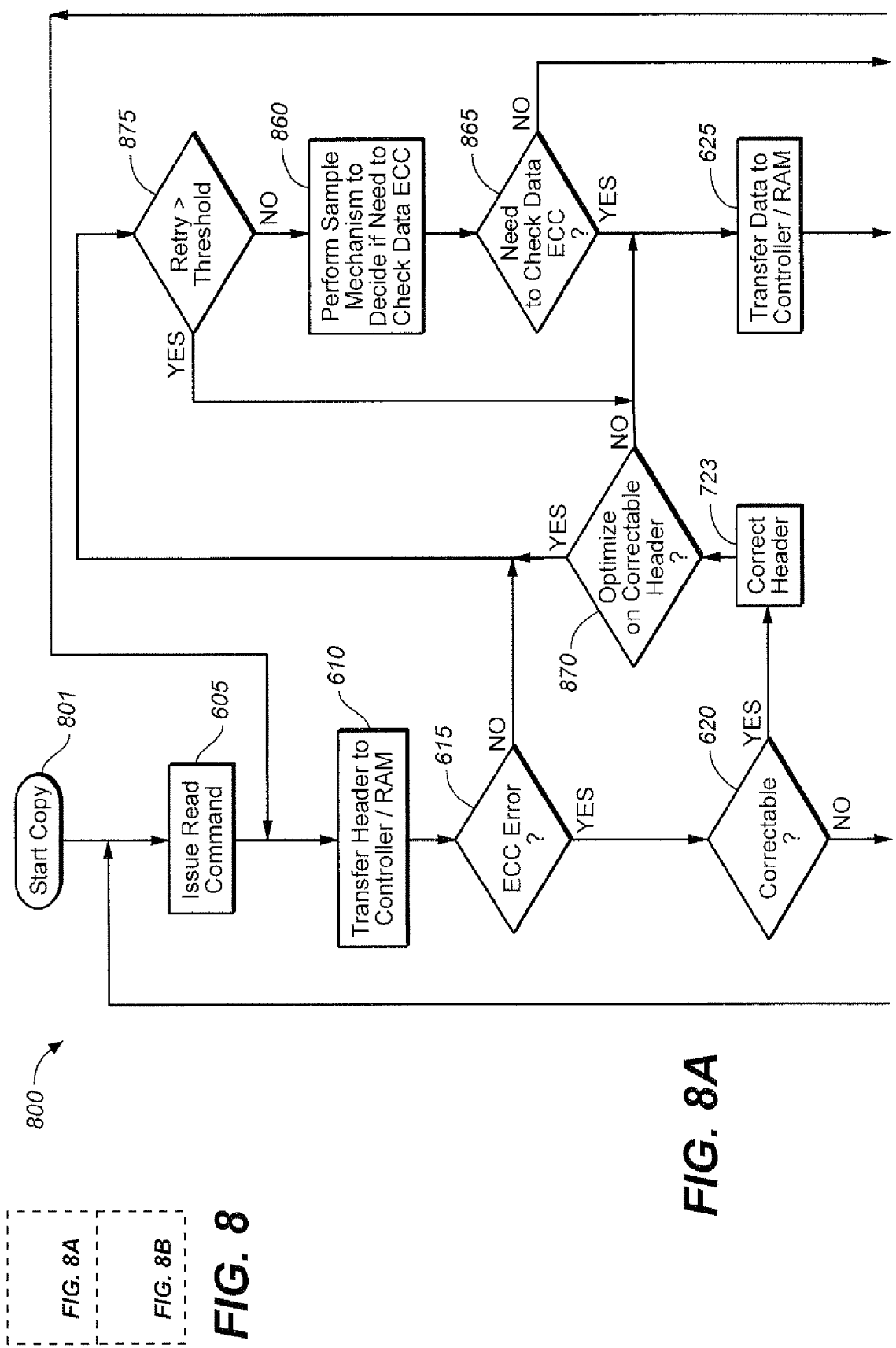
FIG. 8 is a flow chart showing an exemplary method for copying data having an associated error correction code (ECC) in either of the memory systems of FIG. 1 or 2.
Figure 8B:
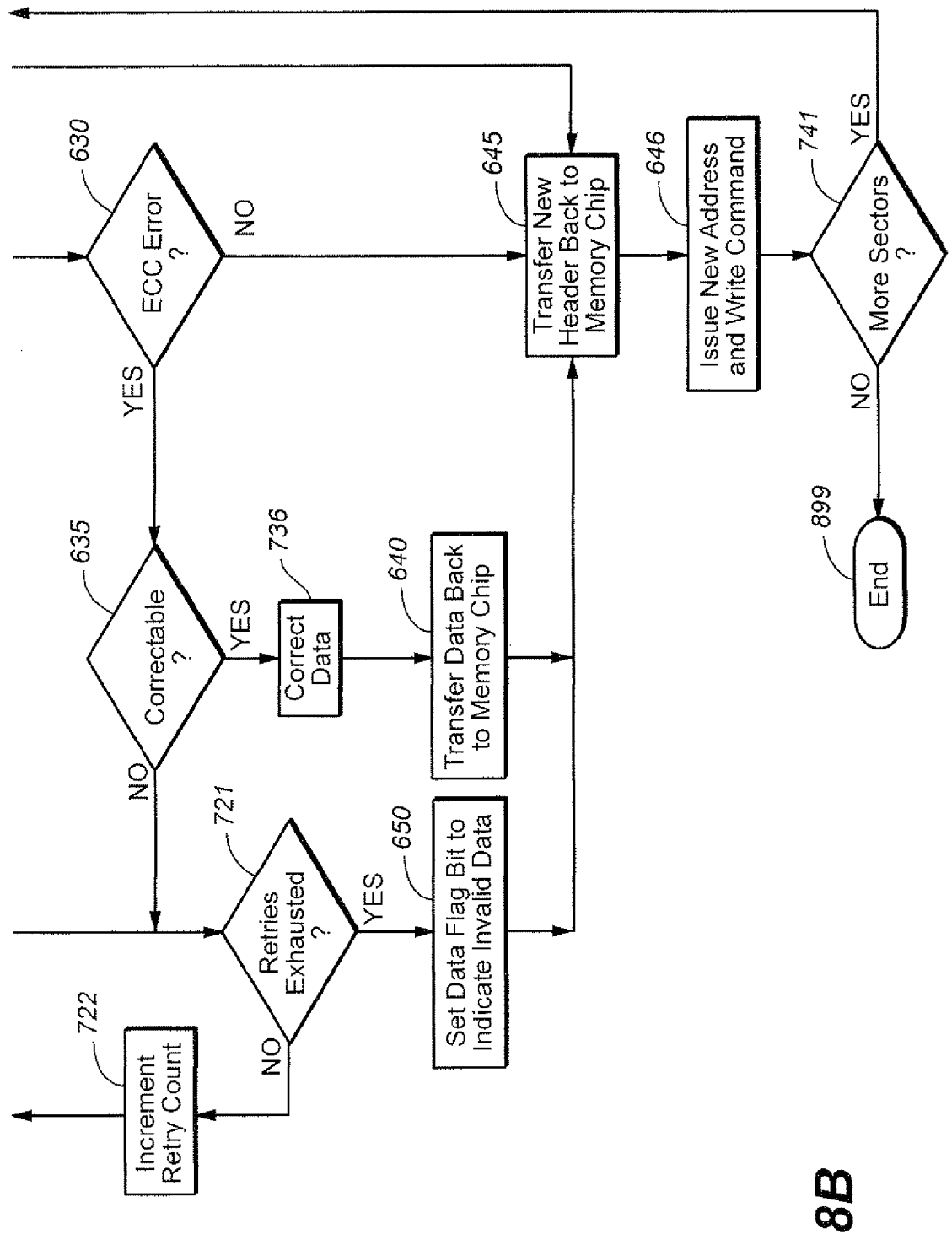
Figure 9A:
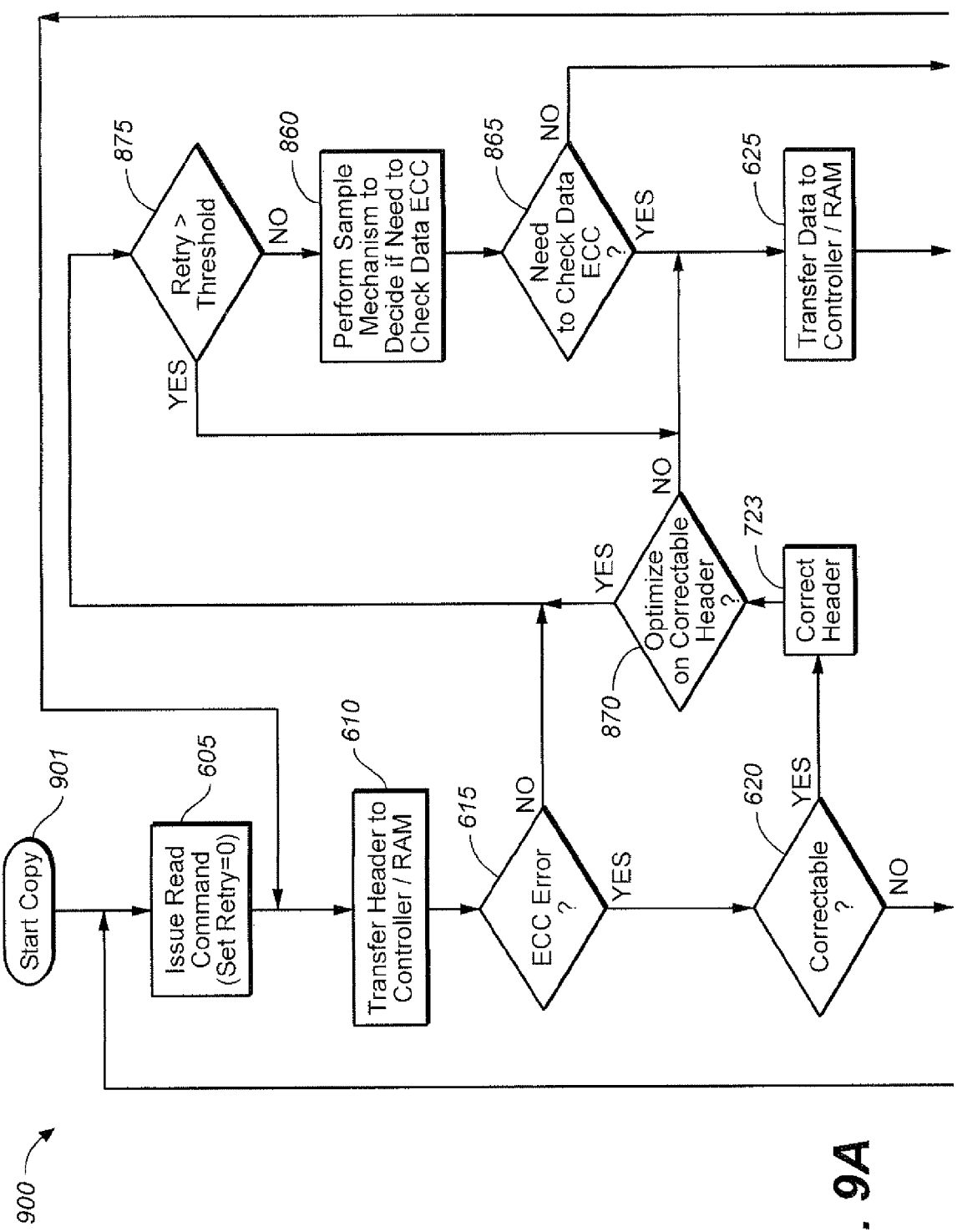
FIG. 9 is a flow chart showing an exemplary method for copying data having an associated error correction code (ECC) in either of the memory systems of FIG. 1 or 2.
Figure 9B:
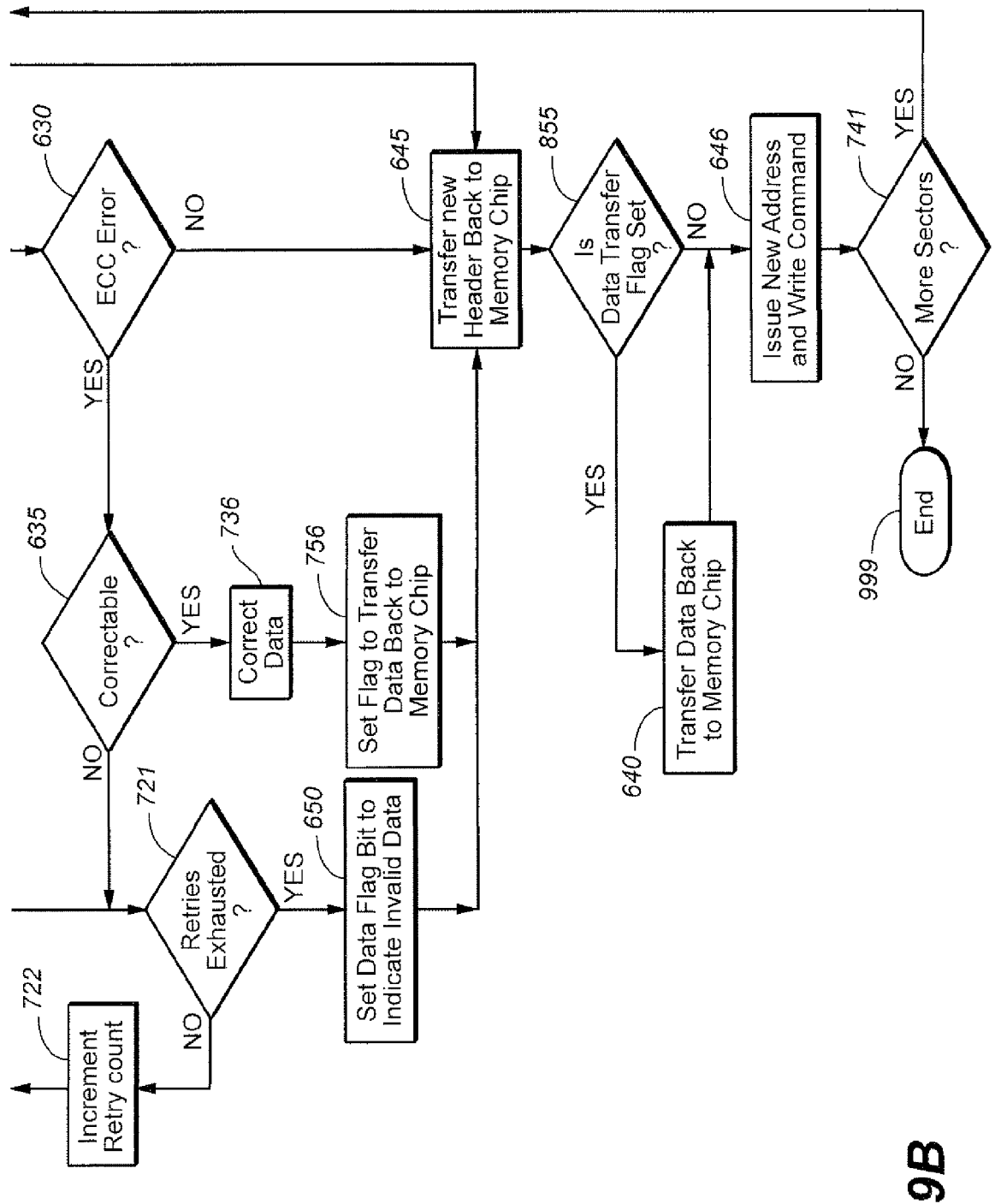
Figure 10:
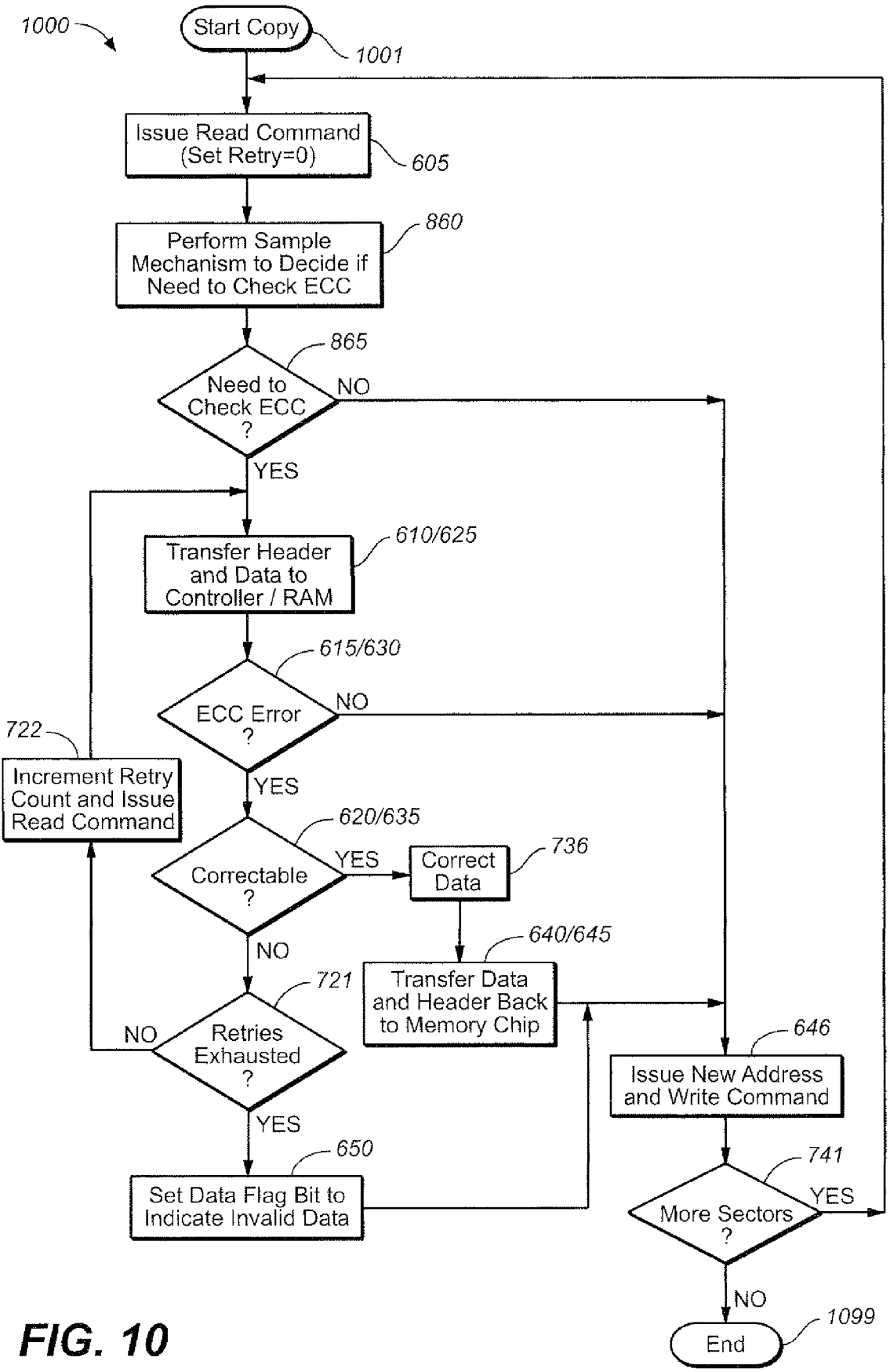
FIG. 10 is a flow chart showing an exemplary method for copying data having an associated error correction code (FCC) covering both the header and data in either of the memory systems of FIG. 1 or 2.

The present invention has a number of aspects that further improve the data relocation process. These aspects, and various combinations of them, are shown in the flows of FIGS. 5-10. FIG. 5 adds the aspect that the ECC is not checked in every relocation operation, but only for a subset of the relocations. The subset can be determined, for example, in a deterministic or on a random (or pseudo-random) basis. This saves on having to transfer the data to the controller for each data set being relocated. FIG. 6 takes advantage of the case where, as is shown in FIG. 3, separate ECC codes are used for user data and the overhead in each sector. This allows the header ECC and data ECC to be treated separately. FIG. 7 adds a number of features to FIG. 6 to improve its performance, including the introduction of a flag structure to indicate whether the data will be transferred back from the controller to the host. FIG. 8 adds a sampling mechanism to the embodiment of FIG. 6 to further improve performance. The sampling mechanism is a variation on the techniques of FIG. 5, where the decision on whether to the check the data ECC is decided based on sampling. FIG. 9 combines the processes of FIGS. 7 and 8. Finally, FIG. 10 is similar to FIG. 8, but for the case when only a single ECC is used for the whole sector; thus, FIG. 10 is also similar to FIG. 5, but where the decision on whether to check a given data set is based on sampling.

All of the described relocation methods can further be improved by incorporating the techniques of U.S. patent application Ser. No. 10/846,289, flied May 13, 2004, which is hereby incorporated by reference. Additionally, although the various aspects of the present invention are presented in terms of the exemplary Flash EEPROM memories shown in FIGS. 1 and 2, these aspects are more generally applicable to the various non-volatile memory systems described in U.S. patent application Ser. No. 10/841,379, filed May 7, 2004, which is also hereby incorporated by reference.

FIG. 5 is a flow chart 500 showing an exemplary copy operation of either of the memory systems of FIG. 1 or 2 when copying data having an associated ECC. The copy operation provides the additional functionality of determining at 535 whether or not to check ECC after reading 405 the data from the first location into the data register. The determination 535 may be made based on predetermined selection criteria. In an exemplary embodiment of the invention, the predetermined selection criteria may be a sampling mechanism. The sampling mechanism may be implemented using algorithms that are random-based or deterministic. For example, a random-based sampling mechanism may employ a random-based algorithm to provide that ECC is checked at random intervals. Such random-based algorithms are well known; see, for example, U.S. Pat. No. 6,345,001, which is hereby incorporated by reference and where such algorithms are applied, in a slightly different context, to non-volatile memories. For deterministic sampling, the sampling mechanism could provide that ECC is checked once for every, say, four copy operations. Alternatively, FCC could be checked every time with every copy operation. Checking ECC with every copy operation provides high reliability and protects against copy errors, but involves a tradeoff in terms of speed of performance.

In an exemplary embodiment of the present invention, the sampling mechanism may use bits that are available to the system, for example bits and flags that are contained in overhead data 335. In the example shown in FIG. 3, the user data ECC and header data ECC are included in overhead data 335, but, in addition to the ECC, overhead data 335 also includes a portion 350. Overhead data portion 350 includes a logical block address (LBA) and a time stamp, and may include a variety of flags, for example a data flag, block type flag, an application-specific flag, and a block flag. The LBA includes a page tag and a logical block number (LBN). The page tag indicates the logical page within a block and may be relative to a plane or memory sub-array. The LBN is a field used to link the data in a physical block to its logical block address. This allows a host system to locate and retrieve data that was previously written. The time stamp indicates the relative age of the data and is associated with the logical block address field. Each time a logical block is assigned to a new physical block, the time stamp for that block is incremented. This value may be used to distinguish which block, among blocks with the same logical block address, is the most recently written block. Other information associated with the block or page may be used for sampling purposes, including, for example, hot counts and information relating to how often the block needs to be scrubbed. Alternatively, sampling mechanism may involve tracking mechanism not included with actual data but stored separately but still associated with the page In an exemplary embodiment of the invention, the sampling mechanism compares the last two bits of the LBA with the last two bits of the timestamp. ECC checking is then selected in accordance with the comparison result. Effectively this provides one in four sampling, such that ECC is checked in one out of four copy operations. This sampling further improves memory performance.

If the sampling mechanism employed at 535 determines whether to check the ECC associated with the read data. If the determination at 535 indicates that ECC is not to be checked, then at 420 the memory is caused to copy the data from the first location to the second location, thus completing the copy operation at 599. If at 535 the determination indicates that the ECC is to be checked, then processing continues as described above in FIG. 4 at 410, 415, 425 and 430.

FIG. 6 is a flow chart 600 showing an exemplary copy operation of either of the memory systems of FIG. 1 or 2 when copying data having an associated ECC. In this example, the contents of the first and second locations in the reprogrammable non-volatile memory include user data and header data associated with the user data, wherein the header data includes information relating to the user data, for example ECC information. The user data ECC and header data ECC may be stored in the page or elsewhere, but in this particular example both the user data ECC and header data ECC are stored in the overhead portion of the page as shown in FIG. 3 and described above. Note that the particular example describes separate header and data ECC, however, the technique is equally applicable where single ECC covers both header and data. In the examples shown in FIGS. 6-9, the ECC of the header data is examined separately as a preliminary step to determine whether the ECC of the user data is worth examining; an example of how these techniques apply to the case of common ECC for the header and data is discussed below with respect to FIG. 10. In an example of the memory systems shown in FIGS. 1 and 2, if the header data are found to have an uncorrectable ECC error, then the user data associated with that header data are assumed to be invalid.

The copy operation shown in flow chart 600 is initiated at 601 and at 605 a read command is issued. The read command is sent to the controller 27, 43 in order to initiate the read of a first location in memory cell array 11, 1. The contents of the first location may comprise user data and header data associated with the user data. The controller 27, 43 interprets the read command and transfers the header data to the random access memory (RAM) 28, 50 of the controller 27, 43. The RAM of the controller is used as a temporary storage location for the contents of the location to be copied. Controller RAM used in this manner is also referred to as scratch pad RAM, or SPR.

The header data are checked to determine whether there is an ECC error in the header data at 615, and if so, at 620 a determination is made as to whether the header data ECC error is correctable. If the header data ECC error is not correctable then at 650 an indicator is set to inform the controller that the user data is invalid. An example of such an indicator is a data flag bit that is set or cleared in response to whether the user data is valid or invalid. This data flag bit may be contained in overhead portion 335 or may be stored elsewhere.

If the header data ECC error is correctable, then it is corrected at 623 and at 625 the user data is read into or transferred to the controller RAM. In a standard on-chip copy operation, the user data is copied from a first location in a memory array 1, 11 to a second location in memory array 1, 11, rather than being transferred to the controller 27, 43. After multiple on-chip copy operations, the data could degrade over time to include a sufficient number of multibit errors that it would be uncorrectable with ECC.

Transferring the user data to the controller RAM 28, 50 at 625 generates an ECC status on the user data. An ECC status check at this point is being used to prevent user data stored in a memory location from getting copied multiple times without ever being read and having any ECC checking being performed on the user data.

If an ECC error is found on the user data at 630, then at 635 a determination is made as to whether the ECC error is correctable. If the ECC error is not correctable then an indicator is set at 650 to inform the controller that the user data is invalid. At noted above, the indicator is a data flag bit used for this purpose. This data bit is set or cleared in accordance with the status of the user data as valid or invalid (and vice versa).

If the ECC error is correctable, then the user data is corrected at 637 and then transferred back to the memory chip at 640. The controller at 640 may be caused to accomplish the transfer at 640 of the data back to the memory chip. After the data transfer, a new header is transferred back to the memory chip at 645. The header data is new in the sense that it is likely to have been updated as a result of the copy operation. Even if the ECC error is not correctable at either of 620 or 635, the new header is copied back at 645, as it will contain the data flag bit that has been set at 650 to indicate the error. This allows the error flag to be stored in the defective sector, so that this information is available when the sector is accessed. A new address and write command are then issued at 646 prior to the completion of the current copy operation at 699.

If at 630 it is determined that an ECC error is not found on the user data, then the user data is not written back to the memory. One reason for not writing the user data portion back to the memory if no ECC error is found is to take advantage of the benefit of an on-chip copy operation.

FIG. 7 is a flow chart 700 showing an exemplary copy operation of either of the memory systems of FIG. 1 or 2 when copying data having an associated error correction code (ECC). Flow chart 700 provides additional functionality to the method shown in flow chart 600, including a retry mechanism for multiple attempts at ECC checking and a flag setting/clearing mechanism to indicate when to transfer data back to the memory chip.

The retry mechanism provides a decision point at 721 in which a retry count is checked. This decision point 721 is reached if the header ECC error is not correctable at 620 or if the user data ECC error is not correctable at 635. If the number of retries is exhausted at 721, then processing continues at 650 where a data flag bit is set to indicate invalid data. Otherwise, if the number of retries are not exhausted, then the retry count is incremented at 722 and processing continues with another read command at 605. The retry count provides for multiple retries where the header ECC is determined to be uncorrectable. The retry count may be predetermined or based on some criteria that are appropriate to the copy operation.

If an ECC error is found on the user data 630, then a determination is made as to whether the user data ECC error is correctable 635. If the EEC error is not correctable then the retry count is checked at 721 and is the number of retries are exhausted, then an indicator is set at 650 to inform the controller that the data is invalid. The data invalid indicator is described further above. If the data ECC error is determined to be correctable at 635 then the ECC error is corrected at 736 and a data transfer flag is set at 756. The data transfer flag is an indicator that the data is correct and should be transferred back to the memory chip. This data transfer flag may be stored as one of the code flags in the controller or may be stored elsewhere. The new or updated header is then transferred back to the memory chip at 645. Then at 755 data transfer flag is checked. If the data transfer flag is set at 755, then the data is transferred back to the memory chip at 640. If multiple sectors are being copied then at 741 a determination is made as to whether there are more sectors to be processed, and if there are, then the header of the next sector is transferred at 610 into the controller RAM. The next sector is then processed as described above. Processing ends at 799 if there are no more sectors found at 741.

If no data ECC error is found at 630, then a data transfer flag is cleared at 757 to indicate that the data should not be transferred back to the memory chip. Clearing the data transfer flag at 757 in the scenario where no data ECC error is discovered provides a performance optimization by not requiring that the data be transferred back to the memory chip. If there is no ECC error on the data, then the copied data is likely to be correct in an on-chip copy, where the memory is caused to copy the data from a first location to a second location is generally sufficient. Performance is improved by not involving the controller in the transaction, and by using the chip to copy the data from the first location to the second location on the chip instead.

FIG. 8 is a flow chart 800 showing an exemplary copy operation of either of the memory systems of FIG. 1 or 2 when copying data having an associated error correction code (ECC). Flow chart 800 adds the features of optimizing on a correctable header and performing a sampling mechanism to determine whether or not to check FCC. These features are described in more detail below. Otherwise, flow chart 800 includes many of the features of flow chart 700 described above, such as the retry mechanism, but does not include, however, the flag setting/clearing mechanism to indicate when to transfer data back to the memory chip. Only the additional features will be described in detail. For further information, see the discussion of FIGS. 6-7 above.

If the header ECC error is determined to be correctable at 620, then the header ECC is corrected at 723. At this point, a decision may be made at 870 to optimize on a correctable header. If the header is correctable, then an assumption may be made that it is not necessary to check the ECC for every single copy operation, and that a sampling mechanism may be employed to take provide optimal performance. If the header optimization is selected at 870, the data ECC will not be checked during every copy operation but instead will be checked in accordance with a sampling mechanism to be discussed further below. In a variation of the exemplary embodiments, even if the header is not correctable at step 620, the data may still be transferred to the controller for an error detection/correction operation since it may be possible to reconstruct the sector's header.

If header optimization is selected at 870, then at 875 a retry threshold may be checked. This retry threshold is performed at a different point in processing from the retry count discussed in connection with 721 and 722, and may be set to a different number based on what conditions are appropriate. One use for the retry threshold at 875 is to optionally prevent header optimization of the copy process in error conditions. The retry threshold may be predetermined or based on some criteria that are appropriate to the copy operation. The retry threshold check at 875 is for determining whether or not to apply a sampling mechanism at 860. If the retry threshold is exceeded at 875, then the sampling mechanism is not selected and processing continues with the transfer of data to controller RAM at 625.

If the header optimization is selected at 870 and the retry threshold at 875 has not been exceeded, then a sampling mechanism is performed at 860. The sampling mechanism is an example of the predetermined selection criteria that may be used to determine whether to check ECC on the data. The sampling mechanism may be random-based or deterministic, and is described in more detail in the discussion of FIG. 5.

The result of applying the sampling mechanism is examined, and a determination is made at 865 as to whether or not the data ECC needs to be checked. If at 875 it is determined that the data ECC needs to be checked, then processing continues with the transfer of the data to controller RAM at 625. If data ECC is not to be checked at 865 then there is no transfer of the data to or from the controller memory at 625, because the data ECC is not being checked in this case. Where there is need to check the data ECC, there is no need to transfer the data to the controller.

The remaining processing steps are similar to those described in the discussion of FIGS. 6-7 above.

FIG. 9 is a flow chart 900 showing an exemplary copy operation of either of the memory systems of FIG. 1 or 2 when copying data having an associated error correction code (ECC). The flow chart 900 provides improved performance by combining the features of FIGS. 6-8, which are described above, including selective on-chip copying and selective ECC checking in which a sampling mechanism may be used for determining when to perform the ECC checking. More specifically, it adds optimization and sampling of steps 860, 865, 870, and 875 of FIG. 8 to the flow of FIG. 7.

FIGS. 6-9 are all for the case where separate ECC is used for the header and the user data. Many of the features introduced in FIGS. 7-9 can also be applied to the case of a combined ECC (or where having separate EEC is not exploited). For example, FIG. 10 introduces many of the features found in FIG. 8, but uses only a single ECC.

More specifically, the process starts at 1001, beginning with the issuance of a read command, with the retry count set at 0, at 605. The sampling mechanism is used at 860 to determine at 865 whether to check the sector being relocated. If not, an on-chip copy of the sector is performed and at 741 the process goes on to the other sectors, if there are more, or ends at 1099, if there are not. If it is determined that the sector needs to be checked, the header and user data are both transferred from the memory register to the controller at 610/625. The rest of the process then follows as from 615/630 as it follows from 630 of FIG. 8, except the header and user data are treated together rather then handling the header ECC separately.

Although the various aspects of the present invention have been described with respect to specific exemplary embodiments, it will be understood that the invention is entitled to protection within the full scope of the appended claims. The patents, patent applications, articles and book portions identified above are all hereby expressly incorporated in their entirety into this Background by these references.

What is claimed is:

1. In a memory system comprising a controller part and a memory part, the memory part including a programmable non-volatile memory array, a method for relocating data from a first location of the memory array to a second location of the memory array wherein the data comprises a user data portion and an overhead portion, the method comprising:

reading the data from the first location into a register on the memory part;

determining in the controller part whether to perform an error detection and correction operation on said data, wherein said determining is performed without transferring a copy of the user data portion to the controller part; and in response to determining that an error detection and correction operation not be performed on said data, writing the data from the register to the second location without the transfer of the copy of the user data portion to the controller part, wherein the method further comprises:

setting a flag value based on whether the user data portion has been corrected as part of said performing an error detection and correction operation; and if the flag value is set to indicate that said user data portion has been corrected, transferring the corrected user data portion back to the register and subsequently writing the contents of register to the second memory location.

2. In a memory system comprising a controller part and a memory part, the memory part including a programmable non-volatile memory array, a method for relocating data from a first location of the memory array to a second location of the memory array wherein the data comprises a user data portion and an overhead portion, the method comprising:

reading the data from the first location into a register on the memory part;

determining in the controller part whether to perform an error detection and correction operation on said data, wherein said determining is performed without transferring a copy of the user data portion to the controller part;

in response to determining that an error detection and correction operation be performed on said data, transferring a copy of said user data portion to the controller part while maintaining said data in the register; and performing an error correction and detection operation on the user data portion in the controller part, wherein the method further comprises:
   setting a flag value based on whether the user data portion has been corrected as part of said performing an error detection and correction operation; and
   if the flag value is set to indicate that said user data portion has been corrected, transferring the corrected user data portion back to the register and subsequently writing the contents of register to the second memory location.

3. The method of claim 2, wherein said data includes an associated error correction code (ECC) and the error correction and detection operation comprises:
   determining, based on said associated ECC, whether the data contains an error; and
   in response to determining that said data contains an error, performing a correction operation on said data.

4. The method of claim 3, wherein if the error correction operation is successfully completed, the method further comprises:
   transferring the corrected data from the controller part to memory part; and
   writing the corrected data to the second location.

5. The method of claim 3, wherein if the error correction is not successfully completed the method further comprises:
   setting an error flag associated with the data.

6. The method of claim 5, wherein the data comprises a header portion and a user data portion and said error flag is written into the header portion.

7. The method of either of claim 1 or 2, wherein said determining whether to perform an error detection and correction operation is deterministic mechanism.

8. The method of either of claim 1 or 2, wherein said determining whether to perform an error detection and correction operation is randomly or pseudo-randomly based.

9. The method of any of claims 1 or 2, wherein said determining whether to perform an error detection and correction operation is based on a sampling mechanism.

10. The method of claim 9, wherein said sampling mechanism is based on overhead data associated with said data.

11. The method of claim 10, wherein said sampling mechanism comprises comparing a time stamp associated with the data to logical address information of the data.

12. The method of claim 2, wherein the data has an associated error correction code (ECC) and said error detection and correction operation comprises:
   determining based on said associated ECC whether the data contains an error; and
   correcting the data using said associated ECC,
   wherein said flag value is set in response to a successfully completing said correcting.

13. The method of claim 12, further comprising:
   setting an error flag associated with the data in response to not successfully completing said correcting.

14. The method of claim 13, wherein the data comprises an overhead portion and a user data portion and said error flag is written into the overhead portion.

15. The method of claim 2, wherein the user data has an associated error correction code (ECC) and the overhead portion has a distinct associated error correction code (ECC), wherein said transferring a copy the of the data and said performing an error detection and correction operation includes
   transferring a copy the of the overhead portion of the data from the register to the controller part while maintaining said data in the register; and
   performing in the controller part an error detection and correction operation on the overhead portion of the data based on the associated overhead ECC and, in response to completing a successful correction operation on the overhead portion of the data, transferring the corrected overhead portion back to the register;
   wherein transferring the copy the of the user portion of the data from the register to the controller part while maintaining said data in the register and performing in the controller part an error detection and correction operation on the user portion of the data based on the associated user data ECC are performed in response to a successful error detection and correction operation on the overhead portion of the data.

16. In a memory system comprising a controller part and a memory part, the memory part including a programmable non-volatile memory array, a method for relocating data from a first location of the memory array to a second location of the memory array wherein the data comprises a user data portion and an overhead portion, the method comprising:
   reading the data from the first location into a register on the memory part;
   determining in the controller part whether to perform an error detection and correction operation on said data, wherein said determining is performed without transferring a copy of the user data portion to the controller part;
   in response to determining that an error detection and correction operation not be performed on said data, writing the data from the register to the second location without the transfer of the copy of the user data portion to the controller part; and
   in response to determining that an error detection and correction operation be performed on said data, transferring a copy of said user data portion to the controller part while maintaining said data in the register and performing an error correction and detection operation on the user data portion in the controller part,
   wherein the method further comprises:
   setting a flag value based on whether the user data portion has been corrected as part of said performing an error detection and correction operation; and
   if the flag value is set to indicate that said user data portion has been corrected, transferring the corrected user data portion back to the register and subsequently writing the contents of register to the second memory location.

* * * * *